United States Patent
Kang (10) Patent No.: US 7,814,282 B2
(45) Date of Patent: Oct. 12, 2010

(54) MEMORY SHARE BY A PLURALITY OF PROCESSORS

(75) Inventor: Se-jin Kang, Seoul (KR)

(73) Assignee: Mtekvision Co., Ltd., Seoul (KR)

(*) Notice: Subject to any disclaimer, the term of this patent is extended or adjusted under 35 U.S.C. 154(b) by 503 days.

(21) Appl. No.: 11/908,585

(22) PCT Filed: Jan. 12, 2006

(86) PCT No.: PCT/KR2006/000138

§ 371 (c)(1),
(2), (4) Date: Sep. 13, 2007

(87) PCT Pub. No.: WO2006/098549

PCT Pub. Date: Sep. 21, 2006

(65) Prior Publication Data

US 2009/0222630 A1    Sep. 3, 2009

(30) Foreign Application Priority Data

Mar. 17, 2005 (KR) .................. 10-2005-0022374

(51) Int. Cl.
*G06F 12/00* (2006.01)
*G06F 13/00* (2006.01)
*G06F 13/28* (2006.01)
*G06F 15/00* (2006.01)
*G06F 15/76* (2006.01)

(52) U.S. Cl. .................. 711/147; 711/154; 712/34

(58) Field of Classification Search .............. 711/147, 711/154; 712/34
See application file for complete search history.

(56) References Cited

U.S. PATENT DOCUMENTS

| 5,761,727 | A | 6/1998 | Wu et al. |
| 5,911,149 | A | 6/1999 | Luan et al. |
| 6,240,492 | B1 | 5/2001 | Foster et al. |
| 6,618,082 | B1* | 9/2003 | Hayashi et al. ........ 348/231.99 |
| 2003/0037178 | A1* | 2/2003 | Vessey et al. ............... 709/319 |
| 2005/0144401 | A1* | 6/2005 | Pantalone et al. ........... 711/151 |

FOREIGN PATENT DOCUMENTS

GB    1150110 A    4/1969

(Continued)

OTHER PUBLICATIONS

Tanenbaum, Andrew. Structured Computer Organization. Prentice Hall, Inc. 1984. pp. 10-12.*

*Primary Examiner*—Kevin L Ellis
*Assistant Examiner*—Ryan Bertram
(74) *Attorney, Agent, or Firm*—Birch, Stewart, Kolasch & Birch, LLP (57) ABSTRACT

The present invention is directed to a method and a device for memory share by a plurality of processors. The portable terminal according to an embodiment of the present invention comprises a main memory; a sub-control unit coupled to the main memory through bus #1, the sub-control unit processing and storing raw data in accordance with a process order, the raw data being stored in the main memory, the main memory being accessed through bus #1; and a main control unit coupled to the main memory through bus #2 and coupled to the sub-control unit independently through bus #3, the main control unit transmitting said process order to the sub-control unit through bus #3. The present invention can prevent the weakening of processing power or the bottleneck problem during the process of information transmission between the memory and a plurality of processors.

16 Claims, 5 Drawing Sheets

FOREIGN PATENT DOCUMENTS

| | | |
|---|---|---|
| JP | 6113157 A | 6/1986 |
| JP | 1217534 A | 8/1989 |
| JP | 7193515 A | 7/1995 |
| KR | 10-2004-0106778 A | 12/2004 |

\* cited by examiner

FIG. 1

CONVENTIONAL ART

FIG. 2

CONVENTIONAL ART

FIG. 3

CONVENTIONAL ART

MEMORY SHARE BY A PLURALITY OF PROCESSORS

CROSS REFERENCE TO RELATED APPLICATIONS

This application is a U.S. National Application of International Application PCT Application No. PCT/KR2006/000138 filed on Sep. 15, 2005, which claims the benefit of priority from Korean Patent Application No. 10-2005-0022374 filed on Mar. 17, 2005. The disclosures of International Application PCT Application No. PCT/KR2006/000138 and Korean Patent Application No. 10-2005-0022374 are incorporated herein by reference.

TECHNICAL FIELD

The present invention is directed to a memory share by a plurality of processors, more specifically to a memory share method by a plurality of processors and a portable terminal having a memory share structure.

BACKGROUND ART

A portable terminal refers to a small electronic device to be carried easily by a user in order to perform a function such as game or mobile communication. A portable terminal can be a mobile communication terminal, a personal digital assistant (PDA) or a portable multimedia player (PMP).

A mobile communication terminal in general is a device designed to allow a mobile user to telecommunicate with a remotely-located receiver. However, technological developments have recently added extra functions, such as the camera function or multi media data playback function, to essential functions, such as the mobile communication function or Short Message Service (SMS), of a mobile communication terminal.

Figure 1:
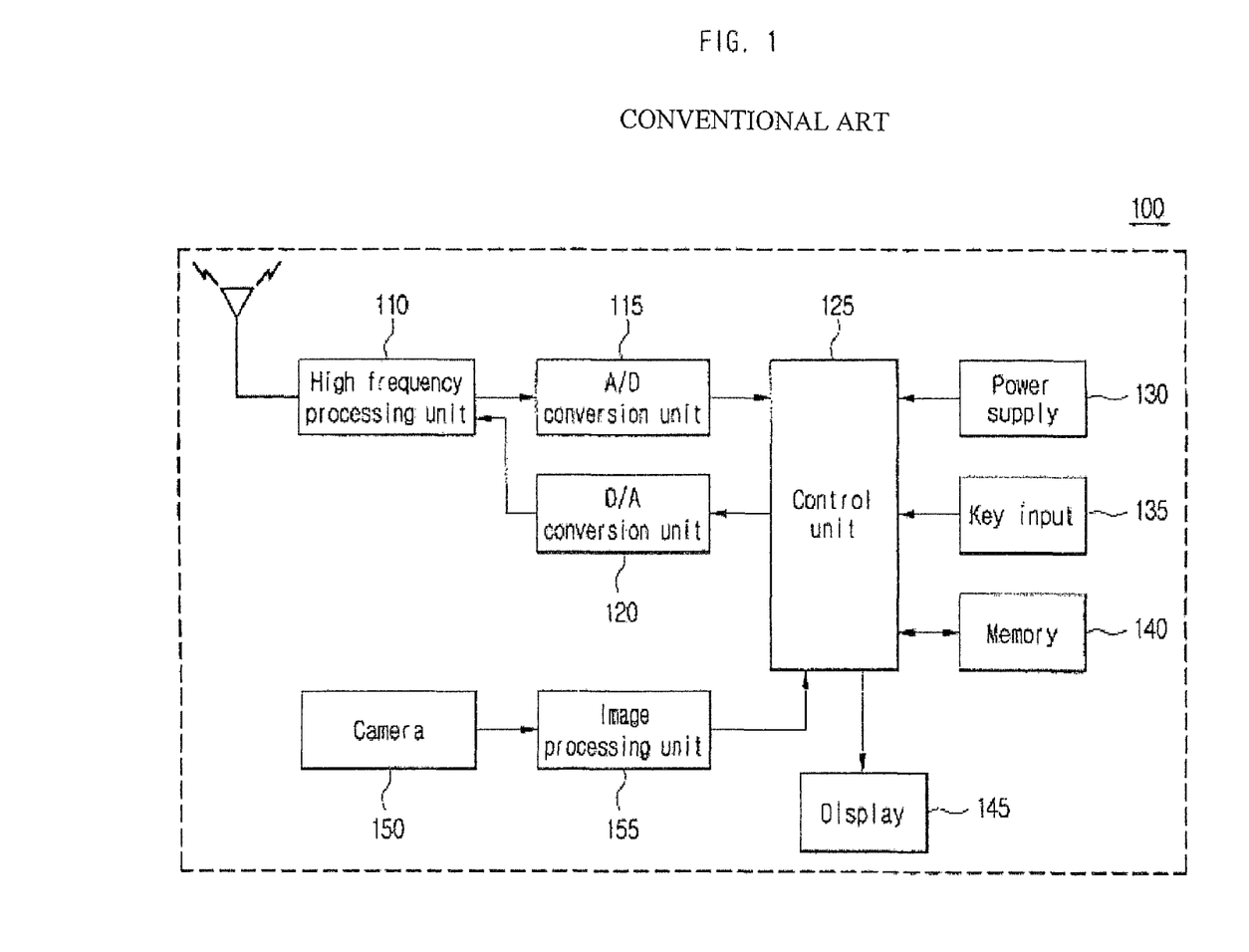
FIG. 1 shows a block diagram of a conventional mobile communication terminal having a camera function.

FIG. 1 shows a block diagram of a conventional mobile communication terminal having a camera function.

Referring to FIG. 1, a mobile communication terminal 100 having a camera function comprises a high frequency processing unit 110, an A/D conversion unit 115, a D/A conversion unit 120, a control unit 125, a power supply unit 130, a key input unit 135, a memory unit 140, a display unit 145, a camera unit 150, and an image processing unit 155.

The high frequency processing unit 110 processes a high frequency signal, which is transmitted or received through an antenna.

The A/D conversion unit 115 converts an analog electrical signal, received from the high frequency processing unit 110, to a digital output signal and sends to the control unit 125.

The D/A conversion unit 120 converts a digital electrical signal, received from the control unit 125, to an analog output signal and sends to the high frequency processing unit 110.

The control unit 125 controls the general operation of the mobile communication terminal 100. The control unit 125 can comprise, for example, a central processing unit (CPU) or micro-controller.

The power supply unit 130 supplies electric power required for operating the mobile communication terminal 100. The power supply unit 130 can be connected to, for example, an external power source or battery.

The key input unit 135 generates key data for setting various functions of the mobile communication terminal 100 or dialing and sends to the control unit 125.

The memory unit 140 stores an operating system, a variety of data, etc. of the mobile communication terminal 100. The memory unit 140 can consist of, for example, a flash memory, an EEPROM (Electrically Erasable Programmable Read Only Memory), etc.

The display unit 145 displays the operation status of the mobile communication terminal 100 and an external image photographed by the camera unit 150.

The camera unit 150 photographs an external image (a photographic subject), and the image processing unit 155 processes the photographed external image. The image processing unit can perform functions such as color interpolation, gamma correction, image quality correction, and JPEG decoding.

As described above, a mobile communication terminal 100 having a camera function is equipped with a plurality of processors (that is, a main controller and one or more sub-controllers for controlling an additional function controlled by the main controller). In other words, a mobile communication terminal 100 having a camera function comprises a control unit 125 for controlling the general function of the mobile communication terminal 100 and an image-processing unit 155 for controlling the camera function.

The sub-controller can take different forms depending on the kinds of additional functions, with which the portable terminal is equipped. For example, a sub-controller for controlling a camera function can process functions such as JPEG encoding or JPEG decoding; a sub-controller for controlling a movie file playback function can process functions such as video file (e.g., MPEG4, DIVX, or H.264) encoding or decoding; and a sub-controller for controlling a music file playback function can process functions such as audio file encoding or decoding. Of course, there can be a sub-controller that can process various aforementioned functions together.

However, since the main memory has a serial structure between the main controller and sub-controller in the conventional art, the processing power can experience weakening or bottleneck during the transmission of message, and development of programs has been increasingly complicated due to the interaction.

DISCLOSURE

Technical Problem

In order to solve aforementioned problem, the present invention aims to provide a portable terminal having a structure and method for memory share between the memory and a plurality of processors such that weakening or bottleneck of the processing power can be prevented during the transmission of messages.

Another object of this invention is to provide a portable terminal having a structure and method for memory share between the memory and a plurality of processors such that development of an operating system can be simplified by minimizing the information delivery process for processing of data.

Another object of this invention is to provide a portable terminal having a structure and method for memory share between the memory and a plurality of processors such that the manufacturing cost can be lowered owing to the elimination of the need for additional memory to improve the bottleneck problem.

Technical Solution

In order to achieve the above objects, an aspect of the present invention features a portable terminal having a structure of memory share by a plurality of processors.

According to a preferred embodiment of the present invention, the portable terminal has a main memory, a sub-control unit, and a main control unit. The sub-control unit is coupled to the main memory through bus #1. The sub-control unit processes and stores raw data in accordance with a process order. The raw data is stored in the main memory, and the main memory is accessed through bus #1. The main control unit is coupled to the main memory through bus #2 and coupled to the sub-control unit through bus #3. The main control unit transmits the process order to the sub-control unit through said bus #3.

The main memory can have a separate interface structure for transmitting and receiving data to and from the sub-control unit through the bus #1 and for transmitting and receiving data to and from the main control unit through the bus #2.

The main memory can comprise a first memory unit being written by the sub-control unit only; a second memory unit being written by the main control unit only; and a third memory unit being shared and written by the sub-control unit and the main control unit.

Moreover, the main memory can transmit an un-accessible message to the second control unit if the second control unit attempts to access the third memory unit while the first control unit is accessed to the third memory unit to write data. The first control unit can be either the main control unit or the sub-control unit, and the second control unit can be the other of either the main control unit or the sub-control unit.

The main control unit can transmit access state information to the sub-control unit if the main control unit accesses the third memory unit for writing data.

The portable terminal can be set such that the bus #2 has priority over the bus #1.

The process order can comprise indication information on the process type of the raw data and a store-location of the raw data.

Furthermore, the process order can further comprise location information for storing raw data processed to correspond to the indication information.

In order to achieve the above objects, another aspect of the present invention features a method for sharing memory by a plurality of processors and/or a recorded medium recording the method thereof.

According to a preferred embodiment of the present invention, the recorded medium tangibly embodies a program of instructions executable by a portable terminal to execute a method for sharing memory by a plurality of processors. The program is readable by the portable terminal. In the recorded medium, a main control unit transmits a process order of raw data, stored in a first area of a main memory, to a sub-control unit through bus #1. Here, the process order comprises indication information on the process type of the raw data and a store-location of the raw data. The sub-control unit accesses the main memory through bus #2 and reads the raw data in the store-location. The read raw data is processed and stored to correspond to the indication information. The main control unit is coupled to the main memory through bus #3 and to the sub-control unit through bus #1, and the sub-control unit is coupled to the main memory through bus #2.

If the process order further comprises location information for storing raw data processed to correspond to the indication information, the sub-control unit stores the processed raw data in a second area corresponding to the location information.

The main control unit recognizes whether the raw data has been processed to correspond to the process order, using an interrupt signal through bus #2.

The main memory has a separate interface structure for transmitting and receiving data to and from the main control unit through bus #3 and for transmitting and receiving data to and from the sub-control unit through bus #2.

The main memory can comprise a first memory unit being written by the sub-control unit only; a second memory unit being written by the main control unit only; and a third memory unit being shared and written by the sub-control unit and the main control unit.

The main memory can transmit an un-accessible message to the second control unit if the second control unit attempts to access the third memory unit while the first control unit is accessed to the third memory unit to write data. The first control unit can be either the main control unit or the sub-control unit, and the second control unit can be the other of either the main control unit or the sub-control unit.

The main control unit can transmit access state information to the sub-control unit if the main control unit accesses the third memory unit for writing data.

210: Main memory
220: Main control unit
230: Sub-control unit

MODE FOR INVENTION

As used in this application, the term, "unit" is intended to refer to a self-contained component of a system, either hardware, a combination of hardware and software, software, or software in execution. For example, a unit can be, but is not limited to being, a process running on a processor, a processor, an electronic circuit executing a process, multiple storage drives (of optical and/or magnetic storage medium), an object, an executable, a thread of execution, a program, and/or a computer. One or more units can reside within an electronic circuit, a process and/or thread of execution.

The present invention, operative advantages of the present invention, and objectives achieved by embodying the present invention shall be apparent with reference to the accompanying drawings and the description therein.

Hereinafter, preferred embodiments of the present invention shall be described in detail with reference to the accompanying drawings. To aid overall understanding of the present invention, the same reference numbers shall be assigned to the same means, regardless of the figure number. Moreover, the numbers (e.g., bus #1, bus #2, first, second, etc.) are only used in the description to identify identical or similar elements.

Figure 2:
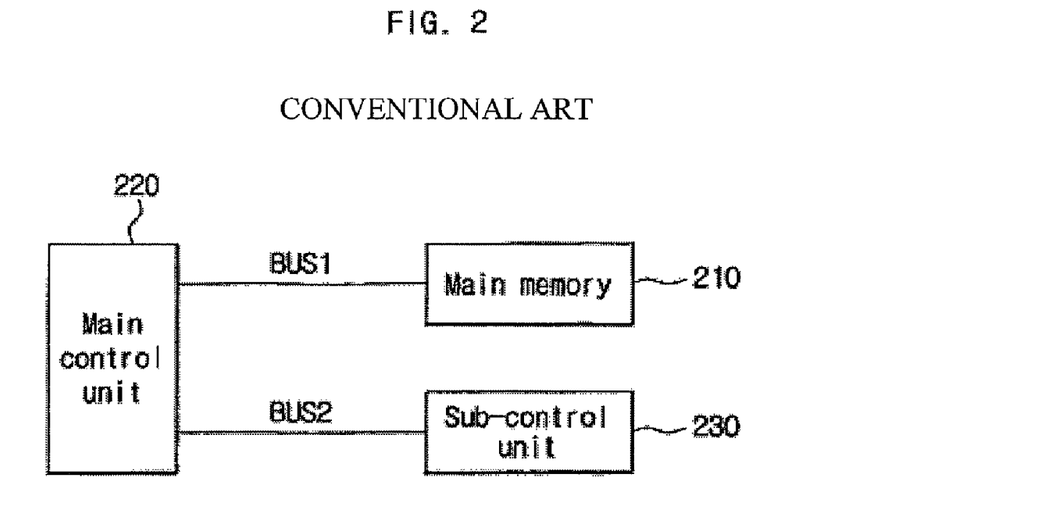
FIG. 2 shows a block diagram of an example of a coupling structure among a main control unit, a sub-control unit and a main memory, based on the conventional art.

FIG. 2 shows a block diagram of one example of a coupling structure among a main control unit, a sub-control unit and a main memory, based on the conventional art.

Referring to FIG. 2, the main memory 210 and the main control unit 220 are coupled to transmit and receive data to and from each other through bus #1, and the main control unit 220 and the sub-control unit 230 are coupled to transmit and receive data to and from each other through bus #2. A bus refers to a common use electric pathway that is used to transmit and receive data to and from among the main memory device, the input device, and the output device in a device such as a computer. A bus comprises a line for data, designating the address of each device or the location of a memory device, and a line for distinguishing a variety of data transmission operation to be processed.

According to a coupling structure illustrated in FIG. 2, the sub-control unit 230 processes data, stored in the main memory 210, and the process result is stored in the main memory 210 again and is outputted by the sub-control unit 230, in which case the process becomes very complicated. In other words, the main control unit 220 reads necessary data in the main memory 210 and transmits the data to the sub-control unit 230. Then, the main control unit 220 reads the process result again that is processed by the sub-control unit 230 and stores the result in a specified space of the main memory 210. Then, the main control unit 220 reads again the process result stored in the main memory 210 and transmits the result to the sub-control unit 230 the has the result outputted through output means (e.g., a display unit). For example, the output means can be coupled in the back of the sub-control unit 230.

As described above, a conventional coupling structure has heavy bus access, requiring the main control unit 220 to be involved with a large number of operations. As a result, power consumption increases, and the system performance is down due to the bottleneck problem. Also, considering that bus #2 is usually slower than bus #1 because bus #1 is mainly interfaced by a memory but bus #2 is interfaced by a variety of peripheral ICs, it is obvious that the bottleneck problem becomes more serious in bus #2.

Figure 3:
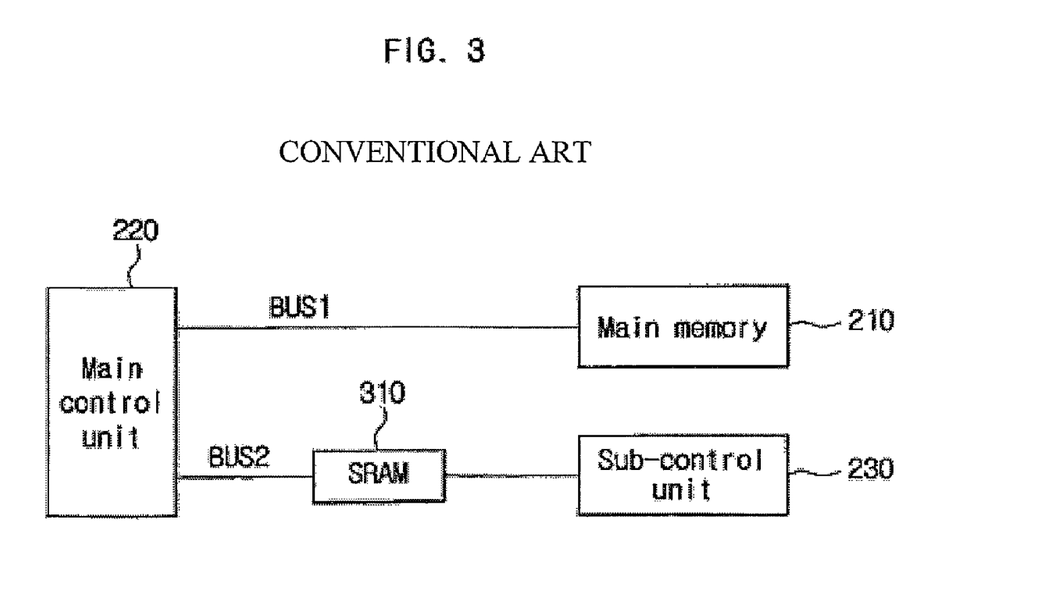
FIG. 3 shows a block diagram of another example of a coupling structure among the main control unit, the sub-control unit and the main memory, based on the conventional art.

FIG. 3 shows a block diagram of another example of a coupling structure among the main control unit, the sub-control unit and the main memory, based on the conventional art.

In the coupling structure shown in FIG. 3, an SRAM (Static Random Access Memory) 310 is disposed between the main control unit 220 and the sub-control unit 230 in order to solve the bottleneck problem that is caused by the coupling structure shown in FIG. 2 and make sharing of data efficient. An SRAM 310 is a random access memory having memory cells of the Flip-Flop method that memorizes stored data as long as power is supplied. However, problems remain with the SRAM 310 in that its operating speed is slow, the memory space is limited, and the cost is high.

Figure 4:
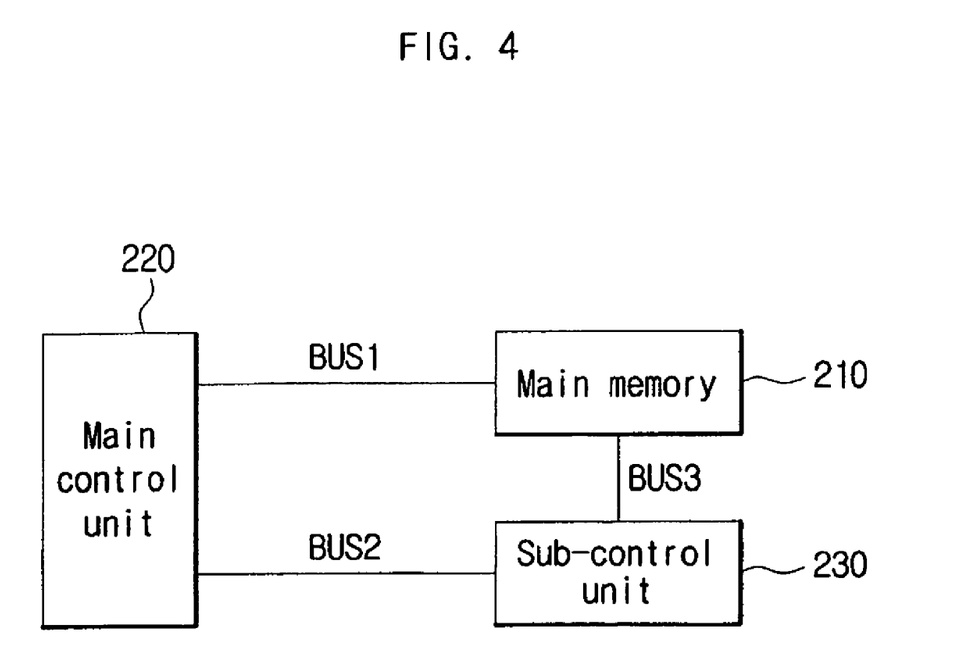
FIG. 4 shows a block diagram of a coupling structure among the main control unit, the sub-control unit and the main memory, based on a preferred embodiment of the present invention.

FIG. 4 shows a block diagram of a coupling structure among the main control unit, the sub-control unit and the main memory, based on a preferred embodiment of the present invention.

Referring to FIG. 4, the main memory 210 and the main control unit 220 are coupled to transmit and receive data through bus #1, the main control unit 220 and the sub-control unit 230 are coupled to transmit and receive a data process order through bus #2, and the sub-control unit 230 and the main memory 210 are coupled to transmit and receive data through bus #3. A bus refers to a common use electric pathway that is used to transmit and receive data among a main memory device, an input device, and an output device in a computer.

The main memory 210 has one or more ports for transmitting and receiving data exclusively to and from the main control unit 220 and one or more ports for transmitting and receiving data exclusively to and from the sub-control unit 230. Of course, the number of ports disposed in the main memory 210 can increase or decrease depending on the quantity of controllers coupled to the bus. The main memory in accordance with the present invention can be wholly or partially, for example, an SDRAM (Synchronous Dynamic Random Access Memory) or a Pseudo SRAM, etc.

Referring to FIG. 4, in case the main memory 210 has two ports and is coupled with the main control unit 220 and the sub-control unit 230 through bus #1 and bus #3, respectively, the main memory 210 is structured with one more set of input/output signals (e.g., clock (CLK), clock enable (CKE), chip select (CS), row address strobe (RAS), column address strobe (CAS), etc) in a memory structure formed with a conventional single port.

In this case, the main memory 210 needs a structure that prevents identical address decoding groups (e.g., bank) from accessing the main memory 210 simultaneously. In other words, a plurality of processors must be prevented from writing data in the same memory space at the same time. While there can be a variety of methods for this, the description herein will focus on the following two methods only.

The first method is a bus arbitration method, in which either the control unit 220 or the sub-control unit 230 is made to yield to the other when the control unit 220 and the sub-control unit 230 attempt to write data at the same time.

In the second method, the main memory 210 presets an access area in which each control unit can access to read/write, and independently assigned access area cannot be cross-accessed. A common area, to which all control units can simultaneously access, is set, and each control unit is made to check the status of other control units when it attempts to access to the common area.

The following describes the second method more specifically. If the main memory 210 is an SDRAM (Synchronous Dynamic Random Access Memory) having, for example, 4 banks, two of the four banks are set up such that only the main control unit 220 has the read/write authority, and the sub-control unit 230 has the read authority only. And one of the rest two banks can be set up such that the sub-control unit 230 has the read/write authority, and the main control unit 220 has the read authority only. The last one bank is set up such that both the main control unit 220 and the sub-control unit 230 have the read/write authority, but the control unit having the access-priority only can write. Here, the access-priority can be checked by, for example, having an extra status register or a pin. However, it is preferable that the main process unit 220 processes through bus #2 the function of giving an access-priority to any sub-control unit 230.

Data consistency has to be realized by the main memory 210 based on the present invention when each of the plurality of multiple control units accesses, processes, and stores data. In the present invention, bus #1 can be a standard interface, but bus #3 may not be a standard interface. In this case, bus #1 and bus #3 can get an access-priority, in which the order of priority is adjusted. In other words, bus #1 can be set such that bus #1 always has a high-priority. Of course, bus #3 can be set to have a high-priority.

Hereinafter, a method for realizing data consistency in the present invention is described through the process of performing a 3D game.

First of all, the main control unit 220 executers a game-engine for performing a 3D game. Executing the game-engine outputs a series of 3D triangle polygons. The main control unit 220 makes the outputted polygon data stored in a first location on the main memory 210. Then, the main control unit 220 transmits a 3D-process order for processing polygon data to the sub-control unit 230 through bus #2. The 3D-process order can comprise the stored-location and the process type (e.g., 3D object generation) of the polygon data.

The sub-control unit 230 reads polygon data to be processed, using location information included in the 3D-process order, and processes a 3D-object.

At the same time, the main control unit 220 stores another polygon data (e.g., 3D-image of the next frame) for 3D processing in the second location on the main memory 210.

If the processing of the polygon data stored in the first location is completed, the sub-control unit 230 stores the result in the first location or the third location designated by the main control unit 220. Then, the sub-control unit 230 starts to process polygon data stored in the second location. The main control unit 220 can transmit the location-information described above to the sub-control unit 230 through bus #2 altogether or whenever necessary.

The aforementioned method is a kind of double buffering for maintaining data consistency, and flow controlling can be performed through bus #2.

Any method, other than what is described above, for maintaining data consistency can be applied without restriction as long as it can be applied in a coupling structure in accordance with the present invention.

For example, in order to prevent broken consistency caused by clashed data at the time of data read/write, a lock-space can be set up such that to stop a latter-accessing control unit from accessing while another control unit accesses the lock-space already. In this case, the latter-accessing control unit starts accessing the lock-space when the processing of the earlier-accessing control unit is completed. In other words, if the main control unit 220 and the sub-control unit 230 use the main memory 210 as a frame-buffer framed sync, an adequate processing speed is expected without double buffering because the main memory 210 has a plurality of ports and can be accessed by a plurality of control units. At this time, since it will be easy for the sub-control unit 230 to frame sync if the sub-control unit 230 knows the address and the segment area used by the main control unit 220 accessing earlier to the lock-space, it needs to transmit related information (that is, the information related to the address and the segment area used by the main control unit 220) to the sub-control unit 230 to sustain data consistency. The related information can be transmitted by the main memory 210 or the main control unit 220. For example, the main memory 210 can transmit a disable signal to the sub-control unit 230 by comparing the address used by the main control unit 220 and the address used by the sub-control unit 230.

Figure 5:
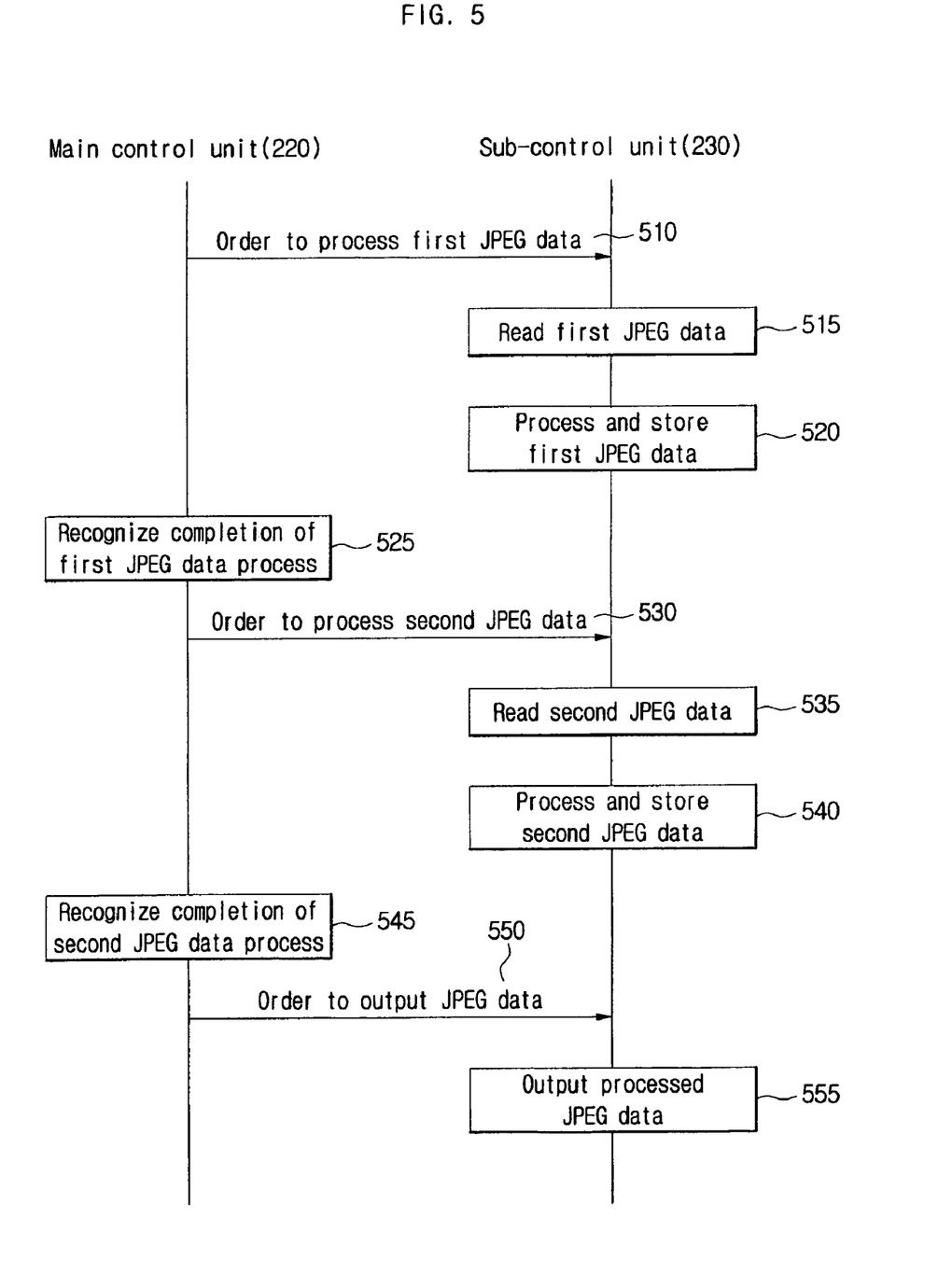
FIG. 5 shows a flowchart of a data control process by a plurality of control units, based on a preferred embodiment of the present invention.

FIG. 5 shows a flowchart of data control process by a plurality of control units, based on a preferred embodiment of the present invention. In this data control process, it is assumed that 2 of the JPEG data is decoded and outputted as if they are one image on a display unit.

Referring to FIG. 5, in step 510, the main control unit 220 transmits a process order of the first JPEG data to the sub-control unit 230 through bus #2 coupled with the sub-control unit 230. The process order can comprise indication information about process type and a store-address of data to be processed and a store-address of processed data.

In step 515, the sub-control unit 230 accesses the main memory 210 through bus #3 in accordance with the process order, and reads the first JPEG data stored in the indicated address.

Then in step 520, the sub-control unit 230 processes (e.g., decoding) the first JPEG data according to the process order, and stores the first JPEG data in the indicated address.

In step 525, the main control unit 220 recognizes that the first JPEG data has been processed. The main control unit 220 can detect that the process is completed, using an interrupt signal delivered through bus #2.

In step 530, the main control unit 220 transmits a process order of the second JPEG data to the sub-control unit 230 through bus #2 coupled to the sub-control unit 230. The process order can comprise indication information about process type, a store-address of data to be processed, and a store-address of processed data.

In step 535, the sub-control unit 230 accesses the main memory 210 through bus #3 in accordance with the process order, and reads the second JPEG data stored in the indicated address.

Then in step 540, the sub-control unit 230 processes (e.g., decoding) the second JPEG data in accordance with the process order, and stores the second JPEG data in the indicated address.

In step 545, the main control unit 220 recognizes that the second JPEG data has been processed. The main control unit 220 can detect that the process is completed, using an interrupt signal delivered through bus #2.

In step 550, the main control unit 220 transmits an output (that is, display through a display unit) order of the processed first and second JPEG data to the sub-control unit 230 through bus #2.

In step 555, the sub-control unit 230 displays the first and second JPEG data, processed by the process order, through a display unit.

Although the flowchart of FIG. 5 assumes that the sub-control unit 230 controls the display unit, it should be evident that the main control unit 220 can display the first and second JPEG data, stored in the indicated address, in case the main control unit 220 controls the display unit.

As described above, it can be understood that the amount of information transmitted and received between a plurality of control units, as well as the quantity of process by each processor, can be minimized. This can be better understood through following conventional art described below.

For convenience of explanation, a process by a conventional coupling structure that decodes 2 of the JPEG data and outputs through a display unit as if they are one image is described.

First, the main control unit 220 reads the first JPEG data to be processed through bus #1 from the main control unit 220, and transmits the first JPEG data to the sub-control unit 230 through bus #2. Then, the main control unit 220 transmits an order for processing (e.g., decoding) the first JPEG data, which is already transmitted, to the sub-control unit 230. The sub-control unit 230 processes the first JPEG data according to the order and temporarily stores the first JPEG data in an internal memory. The main control unit 220 reads the first JPEG data, stored in the sub-control unit 230 temporarily, through bus #2 and stores the first JPEG data in a specific space of the main memory through bus #1.

Next, the main control unit 220 reads the second JPEG data to be processed, through bus #1, and transmits the second JPEG data to the sub-control unit 230 through bus #2. Then, the main control unit 220 transmits an order for processing (e.g., decoding) the transmitted second JPEG data to the sub-control unit 230. The sub-control unit 230 processes the second JPEG data according to the order and temporarily stores the second JPEG data in an internal memory. The main control unit 220 reads the second JPEG data, stored in the sub-control unit 230 temporarily, through bus #2 and stores the second JPEG data in a specific space of the main memory through bus #2.

Finally, the main control unit 220 reads the processed first and second JPEG data, stored in the main memory 210, through bus #1 and then transmits to the sub-control unit 230 through bus #2, and then transmits an order to output through the display unit to the sub-control unit 230 through bus #2. Of course, the main control unit 220 can send the first and second JPEG data, stored in the main memory 210, to the display unit through bus #2.

Figure 6:
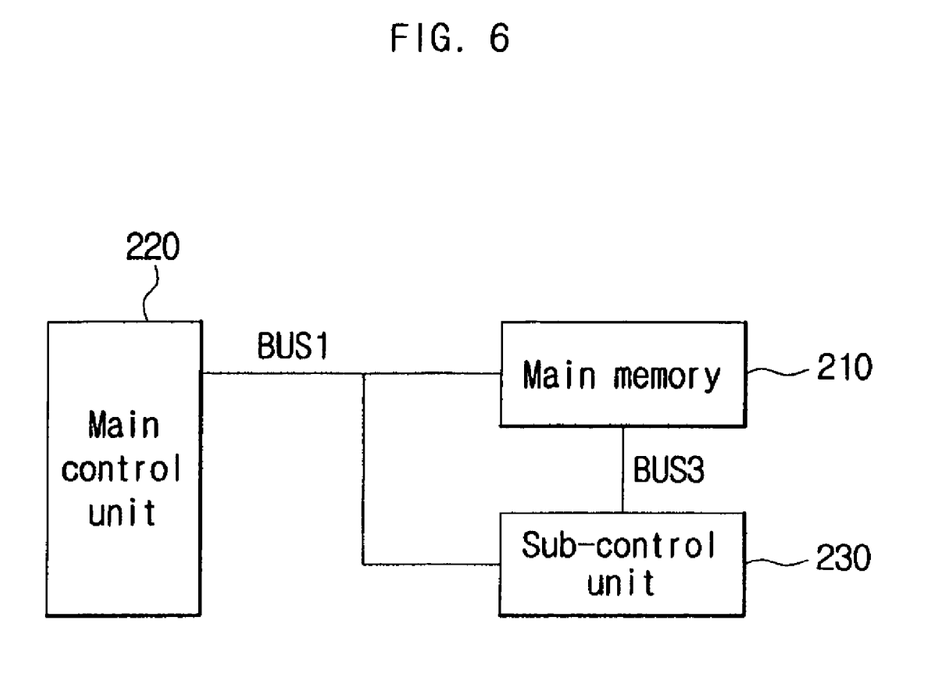
FIG. 6 shows a block diagram of a coupling structure among the main control unit, the sub-control unit and the main memory, based on another preferred embodiment of the present invention.

FIG. 6 shows a block diagram of a coupling structure among the main control unit, the sub-control unit and the main memory, based on another preferred embodiment of the present invention.

Referring to FIG. 6, the main control unit 220 is coupled with the main memory 210 and the sub-control unit 230 for transmitting and receiving information through bus #1, and the main memory 210 is coupled with the sub-control unit 230 for transmitting and receiving information through bus #3.

In this case, unlike the description with reference to FIG. 4, the main control unit 220 can use bus #1 as a pathway for transmitting and receiving an order to and from the sub-control unit 230 and as a pathway for transmitting and receiving data to and from the main memory 210.

The sub-control unit 230, as described earlier, accesses the main memory 210 and processes and stores the data corresponding to the order, received through bus #1, of the main control unit 220.

The drawings and detailed description are only an example of the present invention, serve only for describing the present invention, and by no means limit or restrict the spirit and scope of the present invention. Thus, any person of ordinary skill in the art shall understand that a large number of permutations and other embodiments are possible. The true scope of the present invention must be defined only by the spirit of the appended claims.

INDUSTRIAL APPLICABILITY

As described above, a portable terminal having a structure and a method of memory share between a memory and a plurality of processors, based on the present invention, is able to prevent weakening of processing power or the bottleneck problem during the transmission of messages.

Moreover, the present invention can simplify the development of operating system by minimizing the information delivery process for data processing.

Furthermore, the present invention can reduce the manufacturing cost by eliminating the need to add additional memory for curbing the bottleneck problem.

What is claimed is:

1. A portable terminal having a memory interface, the portable terminal comprising:
   a main memory;
   a sub-control unit, the sub-control unit accessing raw data stored in said main memory, reading said raw data, and processing and storing said raw data in accordance with a process order;
   a main control unit, the main control unit being coupled to said sub-control unit;
   a first bus, the first bus coupling said main control unit to said main memory;
   a second bus, the second bus coupling said main control unit to said sub-control unit; and
   a third bus, the third bus coupling said sub-control unit to said main memory, wherein said main control unit transmits said process order to said sub-control unit through said second bus,
   said process order comprises indication information on a process type of said raw data and a store-location of said raw data, and
   said sub-control unit using said indication information on said process type of said raw data in said processing of said raw data, and using said indication information on said store-location of said raw data in said storing of said raw data.

2. The portable terminal of claim 1, wherein said main memory has a separate interface structure for transmitting and receiving data to and from said sub-control unit through said third bus and for transmitting and receiving data to and from said main control unit through said first bus.

3. The portable terminal of claim 1, wherein said main memory comprises:
   a first memory segment, the first memory segment being a memory dedicated to said sub-control unit only;
   a second memory segment, the second memory segment being a memory dedicated to said main control unit only; and
   a third memory segment, the third memory segment being shared by both said sub-control unit and said main control unit.

4. The portable terminal of claim 3, wherein:
   said main memory transmits an un-accessible message to a second control unit if said second control unit attempts to access said third memory segment while a first control unit is accessed to said third memory segment to write data; and
   said first control unit is either said main control unit or said sub-control unit, and said second control unit is the other of either said main control unit or said sub-control unit.

5. The portable terminal of claim 3, wherein said main control unit transmits access state information to said sub-control unit if said main control unit accesses said third memory segment for writing data.

6. The portable terminal of claim 1, wherein said first bus has priority over said third bus.

7. The portable terminal of claim 1, wherein said process order further comprises location information for storing raw data processed to correspond to said indication information.

8. A computer-readable storage medium tangibly embodying a program of instructions executable by a portable terminal to execute a method for sharing memory by a plurality of processors, the program comprising instructions for:
   transmitting a process order of raw data, stored in a first area of a main memory, from a main control unit to a sub-control unit through a second bus, wherein said process order comprises indication information on a process type of said raw data and a store-location of said raw data;
   accessing said main memory through a third bus with said sub-control unit;
   reading said raw data in said store-location with said sub-control unit; and
   processing and storing said read raw data corresponding to said indication information with said sub-control unit,
   wherein said main control unit is coupled to said main memory through a first bus and to said sub-control unit through said second bus, and said sub-control unit is coupled to said main memory through said third bus, and said indication information on said process type of said raw data is used by said sub-control unit in said processing of said raw data, and said indication information on said store-location of said raw data is used by said sub-control unit in said storing of said raw data.

9. The computer-readable storage medium of claim 8, wherein if said process order further comprises location information for storing raw data processed to correspond to said indication information, said sub-control unit stores the processed raw data in a second area corresponding to said location information.

10. The computer-readable storage medium of claim 8, wherein said main control unit recognizes whether said raw data has been processed to correspond to said process order, using an interrupt signal through said second bus.

11. The computer-readable storage medium of claim 8, wherein said main memory has separate interfaces structure for transmitting and receiving data to and from said main control unit through said first bus and for transmitting and receiving data to and from said sub-control unit through said third bus.

12. The computer-readable storage medium of claim 8, wherein said main memory comprises:
a first memory segment, the first memory segment being written by said sub-control unit only;
a second memory segment, the second memory segment being written by said main control unit only; and
a third memory segment, the third memory segment being shared by said sub-control unit and said main control unit.

13. The computer-readable storage medium of claim 12, wherein:
said main memory transmits an un-accessible message to said second control unit if said second control unit attempts to access said third memory unit while said first control unit is accessed to said third memory unit to write data; and
said first control unit is either said main control unit or said sub-control unit, and said second control unit is the other of either said main control unit or said sub-control unit.

14. The computer-readable storage medium of claim 13, wherein said main control unit transmits access state information to said sub-control unit if said main control unit accesses said third memory unit for writing data.

15. The portable terminal of claim 1, wherein said raw data includes JPEG data, and said process type of said raw data includes decoding of said JPEG data.

16. The computer-readable storage medium of claim 8, wherein said raw data includes JPEG data, and said process type of said raw data includes decoding of said JPEG data.

* * * * *